United States Patent
Ried et al.

(10) Patent No.: US 7,351,373 B2
(45) Date of Patent: Apr. 1, 2008

(54) METHOD FOR THE OXIDATIVE TREATMENT OF BULK MATERIAL

(75) Inventors: Achim Ried, Bay Oeyenhausen (DE); Martin Kampmann, Gütersich (DE); Frank Spranzel, Bad Lippspringe (DE)

(73) Assignees: Gebrueder Loedige Maschinebau-Gesellschaft mbH, Paderborn (DE); Wedeco Umwelttechnologie GmbH, Herford (DE)

( * ) Notice: Subject to any disclaimer, the term of this patent is extended or adjusted under 35 U.S.C. 154(b) by 559 days.

(21) Appl. No.: 10/494,851

(22) PCT Filed: Sep. 17, 2002

(86) PCT No.: PCT/EP02/10422

§ 371 (c)(1),
(2), (4) Date: Oct. 27, 2004

(87) PCT Pub. No.: WO03/041882

PCT Pub. Date: May 22, 2003

(65) Prior Publication Data

US 2005/0059850 A1    Mar. 17, 2005

(30) Foreign Application Priority Data

Nov. 13, 2001  (DE) .................................. 101 55 516
Nov. 20, 2001  (DE) .................................. 101 56 540

(51) Int. Cl.
   *A61L 9/00*     (2006.01)
(52) U.S. Cl. ...................................................... 422/32
(58) Field of Classification Search ................... 422/32
   See application file for complete search history.

(56) References Cited

U.S. PATENT DOCUMENTS 4,183,146 A * 1/1980 Tsukamoto et al. ........... 34/389
6,521,339 B1 * 2/2003 Hansen et al. ............... 428/378

FOREIGN PATENT DOCUMENTS

EP            588704 A2 *  3/1994

* cited by examiner

*Primary Examiner*—Walter D. Griffin
*Assistant Examiner*—Lydia Edwards
(74) *Attorney, Agent, or Firm*—Schweitzer Cornman Gross & Bondell LLP

(57) ABSTRACT

The invention relates to the oxidative treatment of bulk material in a vessel. The bulk material to be treated is placed in the vessel, and is humidified therein with water or an aqueous solution to such an extent that it can be treated with an O2/O3 gas mixture in such a way that the desired end product has a determined pH value or a determined solubility or a determined polarity or a determined solubility behaviour and/or particle size distribution. The inventive method enables bulk material to be very effectively oxidised by means of minimal amounts of ozone in an O2/O3 gas mixture, in such a way that between 70 and 100% of the ozone parts enter into a reaction.

15 Claims, 1 Drawing Sheet

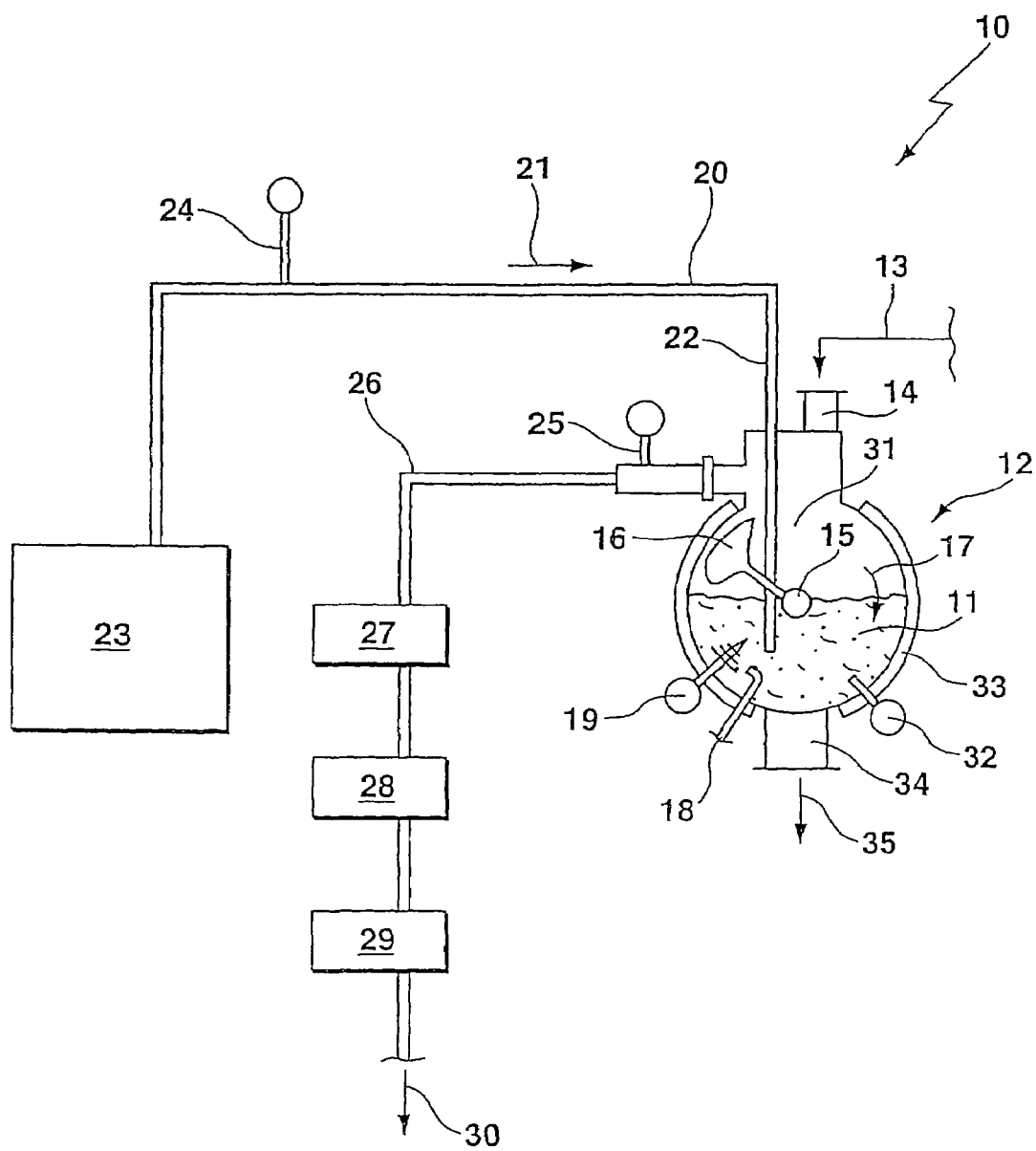

METHOD FOR THE OXIDATIVE TREATMENT OF BULK MATERIAL

The invention relates to a method for the oxidative treatment of bulk materials in a container and to a processing station, which is connected with the container and which processes oxygen into a mixture of oxygen and ozone gases, the gas mixture, flowing into the container, being mixed with the bulk material that is to be treated and the gas mixture flowing out of the container, provided that it still contains ozone, being purified to remove solids and reduced to oxygen in equipment downstream from the container.

Such a method has become known from the DE 195 12 448 C2. With the known method, contaminated material, especially soil material, is treated in a batch-operated mixer with ozone ions so that the contaminants, present in the soil material, are broken down. The oxidizable contaminants are decomposed into environmentally friendly components such as oxygen, water or carbon dioxide. Organic and inorganic contaminants, with which the soil material is contaminated, are broken down by treatment with ozone ions, the oxidation capability of which is greater than that of ozone molecules, which are not ionized. At the same time, the contaminated soil material in a mixer is agitated while the ozone ions are being introduced.

Furthermore, the German Offenlegungsschrift 43 02 020 discloses a method for the oxidative destruction of substances deposited in the soil. For this method, the soil is treated in a rotating reactor with ozone-containing oxygen.

It is an object of the present invention to change the product properties of bulk materials selectively by treatment with a mixture of oxygen and ozone gases, so that the pH of the bulk material, treated with the mixture of oxygen and ozone gases, has a specified value.

Pursuant to the invention, this objective is accomplished owing to the fact that the bulk material, which is to be treated in the container, is moistened before and/or during the treatment with the mixture of oxygen and ozone gases, so that the moisture content of the bulk material is not more than 40%, based on the total weight of the bulk material, which is to be treated.

With that, the inventive method has the significant advantage that the extent of the reaction between the mixture of oxygen and ozone gases and the bulk material, which is to be treated, can be controlled selectively by the addition of moisture. Not only can the oxidation and/or the splitting of chains and/or ring structures of bulk organic materials be controlled by the addition of moisture, but the pH of the bulk material, which is to be treated and which forms the starting point for the treatment with the mixture of oxygen and ozone gases, can also be specified. The moistening of the bulk material causes the individual particles to swell or be coated with a liquid film, which favors the oxidation of individual element groups, depending on the bulk material, which is to be treated. The moisture, introduced into the bulk material that is to be treated, can react with the mixture of oxygen and ozone gases or selectively support the reaction with the bulk material itself. There is a positive effect on interfacial reactions and individual particles of the bulk material become more accessible for the oxidation with the mixture of oxygen and ozone gases. It is possible to carry out the reaction selectively.

Moisture is added to a bulk material, which is to be treated, only to the extent it retains, at least batchwise, a fluidizable, flowable bulk material behavior. The bulk material, which is to be treated, is moved intensively in a mixer, so that the bulk material particles, which have been moistened or have a particular moisture content, achieve the best possible contact with the mixture of oxygen and ozone gases introduced into the mixer and the desired reaction can take place. The bulk material, which is to be treated, such as starch, cocoa fragments, kaolin or mechanical wood pulp, is moistened before and/or during the treatment with the mixture of oxygen and ozone gases only to the extent required for carrying out the reaction in the desired manner. With the inventive method, a change in the pH, for example, from 5.5 to 3.0 in the case of starch, can be brought about very effectively, selectively and within very short reaction times, which are between one minute and 60 minutes, the hydrophilicity can be increased, the solubility behavior as a function of temperature can be changed, for example, lowered, and viscosity changes, such as a decrease in viscosity at a constant solids content in a solution, can be achieved. The bulk material, which is to be treated, can be moved in the mixer by means of different mixing elements and, at the same time, the mixing container can be aligned so that it is largely horizontally, at an angle to the vertical plane or vertical. The inventive method is suitable for batch operations, for quasi continuous operations and for continuous operations.

For other bulk materials, the sensitivity of the product of the bulk material, which is to be treated, to the mixture of oxygen and ozone gases is intensified or attenuated by the extent of the moistening before and/or during the treatment with the mixture of oxygen and ozone gases. Alcohol groups are converted selectively into acid groups, the treated end product, if desired, is made more polar or compounds, occurring in natural materials, are oxidized, so that bulk goods, treated with the inventive method, are tinted less and, in solution at a high concentration, have a lower viscosity. For example, microorganisms, present in a bulk material, can be inactivated depending on the moisture content before and/or during the treatment with the mixture of oxygen and ozone gases. The inventive method is distinguished owing to the fact that an extensive reaction of ozone is ensured by this large gas-solids exchange that is ensured in the container. Depending on the bulk material and the conduct of the process, 70 to 100% of the ozone, which is passed into the bulk material that is to be treated, is reacted, so that the proportion of ozone in the waste gas, which must be reduced to oxygen before the gas can be released without contaminating the atmosphere, is only slight.

In a further development of the inventive method, the bulk material, which is to be treated, is cooled or heated before and/or during the treatment with the mixture of oxygen and ozone gases.

This has the advantage that the temperature in the bulk material, which is to be treated, can be varied selectively during the course of a reaction. As a result, it is easier to carry out the process in the desired manner, the effectiveness of the reaction can be improved and selective steps of the reaction can be favored. In the case of exothermic reactions, the reaction temperature in the bulk material, which is to be treated, can be kept constant by cooling the bulk material during the treatment with the mixture of oxygen and ozone gases.

In a further development of the inventive method, the bulk material, which is to be treated, is moistened with water or an aqueous solution, such as acetic acid or sodium hydroxide solution.

This has the advantage that certain steps of the reaction can be favored or retarded during the treatment with the mixture of oxygen and ozone gases. Different product properties can be achieved if, for example, the treatment of starch with the mixture of oxygen and ozone gases is started at a pH of 5.5 or at a pH of 7 or if the swelling of the starch before the treatment with the mixture of oxygen and ozone gases is varied.

With the inventive method, portions of natural materials of the bulk material and/or the bulk material itself, which is to be treated, are oxidized and/or depolymerized. This has the advantage that the bulk material, treated with the mixture of oxygen and ozone gases, has new product properties, which do not characterized the untreated bulk material. For example, bulk material, treated with the inventive process, can be used in application processes, which require, for example, complete solubility at lower temperatures.

Moreover, in one version of the inventive method, the bulk material, which is to be treated, is mixed in the container with the mixture of oxygen and ozone under a pressure of not less than 1 bar. This has the advantage that a greater conversion of ozone in the bulk material, which is to be treated, is achieved.

Advantageously, the oxidation and/or depolymerization of the bulk material, which is to be treated, is carried out under controlled and/or regulated conditions, in that the proportion of ozone in the gas mixture, flowing into or out of the container, is determined continuously or at particular time intervals. This has the advantage that the proportion of ozone in the gas mixture can be utilized in the best possible way for the reaction with the bulk material, which is to be treated, and, at the same time, the treatment time can be determined, after which the treated material has the desired, specified product properties.

Advantageously, the product properties, specified for the bulk material treated with the mixture of oxygen and ozone gases, are controlled and/or regulated by determining the moisture content of the bulk material. This has the advantage that the treatment of a bulk material with the mixture of oxygen and ozone gases can be monitored and checked by determining a simple process parameter.

The variation of the ozone concentration in the mixture of oxygen and ozone gases and/or the residence time of the mixture of oxygen and ozone gases in the container are further process parameters.

This has the advantage that the product sensitivity of the bulk material, which is to be treated, can be taken into consideration in general and the product sensitivity of the bulk material to ozone can be taken into consideration in particular. The quality of the product can be improved and the amount of ozone, required for the treatment, can be optimized, that is, minimized.

It is particularly advantageous if the container is operated when filled to the extent of 10 to 80%. This has the advantage that the bulk material, which is to be treated, can be moved intensively in the container, so that the positional change of the individual particles, required for homogeneous, uniform moistening, as well as the contact with the mixture of oxygen and ozone gases are ensured. Only if the liquid and gas are exchanged intensively with the bulk material, which is to be treated, can the amount of liquid and gas used be minimized and the reaction times between the solids and gas shortened.

Preferably, the oxidation and/or the depolymerization of the bulk material, which is to be treated, are carried out in a batchwise and/or continuously operating plowshare mixer. This has the advantage that the bulk material, which is to be treated, can be moved in these machines, in blast rock, as well as in a mechanically produced fluidized bed or in the blended material ring. In these machines, the bulk material can, on the one hand, be moistened homogeneously and uniformly and, on the other, treated with the mixture of oxygen and ozone gases.

It is particularly effective if the mixture of oxygen and ozone gases and the liquid, consisting of water or an aqueous solution, are introduced in the lower part of the container simultaneously or at offset times into the bulk material, which is to be treated. This has the advantage that the liquid, as well as the mixture of oxygen and ozone gases, can be brought into intensive contact with the bulk material, which is to be treated. Local increases in concentration can be avoided reliably and larger agglomerations can also be excluded.

Advantageously, the end product after the oxidation and/or the depolymerization can be dried in the container to the desired final moisture content. This has the advantage that no further equipment is required in order to dry the bulk material treated with the mixture of oxygen and ozone gases, for achieving a certain end product with a specified residual moisture content. Likewise, the particle size distribution of the end product aimed for can be adjusted by varying the mixing elements mounted movably in the container and/or by additional mixing, cutting and/or agglomerating elements, rotating at high speed in the container. This has the advantage that a wide range of product variations can be achieved in conjunction with the inventive method and the machines preferably used therewith.

Further advantages and possible applications of the present invention arise out of the following description of the Figures, which describes one possible method by way of example.

In the highly diagrammatic flow diagram for the method, the construction of the equipment, which is labeled 10 and intended for the oxidative treatment of bulk material, is shown. The bulk material 11, which is to be treated, is brought into a plowshare mixer 12 in the direction of the arrow 13 over product-entry connecting pieces 14. A mixing shaft 15, on which mixing elements 16, in this case plowshare blades, are mounted, passes through the interior of the plowshare mixer 12. The mixing elements 16 are mounted on the mixing shaft 15 in such a manner, that the bulk material 11, which is to be treated, can move in the mixing space completely without any dead zones. The mixing elements are rotated in the direction of arrow 17 by the mixer shaft 15 and therefore dip constantly into the bulk material 11, which is to be treated and is in the plowshare mixer 12.

The bulk material 11, which is to be treated in the plowshare mixer 12, can be moistened by means of the liquid-adding device 18. A lance with a nozzle, which sprays the liquid that is to be introduced, frequently is used as liquid-adding device 18. For the equipment under consideration, the liquid is sprayed into the region of product distribution elements 19, which are rotating at high speed and ensure that the liquid supplied is distributed homogeneously and uniformly and without forming agglomerations in the bulk material, which is to be treated. The product distribution elements 19, as well as the mixer shaft 15 are driven by a motor, a transmission, if necessary, being interposed.

A mixture of oxygen and ozone gases 20 is introduced in the direction of arrow 21 over a feed pipe 22 into the moisture-laden bulk material 11, which is to be treated. The mixture of oxygen and ozone gases is produced in an ozone generator 23, which is supplied, for example, from oxygen cylinders. The proportion of ozone in the mixture of oxygen and ozone gases is measured in a first gas-concentration measuring device 24, so that the bulk material 11, which is to be treated, can be treated selectively in the plowshare mixer 12. Furthermore, the volumetric flow rate, at which the mixture of oxygen and ozone gases is flowing into the plowshare mixer 12, is determined. The bulk material 11, which is to be treated, is treated in the plowshare mixer 12 until the desired product properties, which are to be attained by the treatment with the mixture of oxygen and ozone gases, have been reached. A pressure-measuring device 25, by means of which the process pressure in the plowshare mixer 12 can be determined and controlled, is provided in a waste gas pipeline, which is connected directly with the interior of the plowshare mixer 12. The plowshare mixer 12 is designed so that it can move and, in this case, intensively mix the bulk material 11, which is to be treated, at an elevated pressure as well as at a reduced pressure, relative to atmospheric pressure. Furthermore, the plowshare mixture 12 is designed so that ozone cannot escape into the environment, as long as the bulk material 11, which is to be treated, is being treated with the mixture of oxygen and ozone gases.

The mixture of oxygen and ozone gases flowing out is detected by a second gas-concentration measuring device 27 in a waste gas pipeline 26 with devices for separating dust, such as a cyclone or a filter, which are not shown. The proportion of ozone, present in the waste gas, is determined in the second gas-concentration-measuring device 27. The ozone, determined in the second gas-concentration-measuring device 27, is reduced to oxygen in a reducing unit 28. A third gas-concentration-measuring device 29 is used to check once again whether the gas stream is now free of ozone. If the gas stream now is ozone-free, it can be discharged into the atmosphere in the direction of arrow 30. Several ozone monitoring sensors, which can detect increased ozone values in the surroundings of the plant, can be disposed in the surroundings of the plant 10. If a maximum, specified concentration of ozone in the atmosphere surrounding the plant is exceeded, the ozone generator 23 is switched off and a trouble signal lights up.

The plowshare mixer 12 is filled with the bulk material 11, which is to be treated, so that free space 31 remains in the plowshare mixer, in which the bulk material, which is to be treated, can be moved or thrown, so that good mobility of particle is possible in the mixing space of the plowshare mixer 12. By means of such a mobility, a good exchange of material between solid, liquid and gas is ensured. During the whole of the treatment time with the mixture of oxygen and ozone gases 20, the product temperature of the bulk material 11, which is to be treated, can be detected using a temperature sensor 32. Jacket heating or cooling 33, by means of which the bulk material 11 can be heated or cooled, is provided at the plowshare mixer 12. When the desired oxidation or depolymerization of the bulk material 11, which is to be treated, is concluded, the product can be removed from the plowshare mixer 12 in the direction of arrow 35 through the product discharge connecting piece 34. Prior to this, the treated bulk material 11 in the plowshare mixer 12 can be dried to the desired residual moisture content.

The bulk material 11, which is to be treated, can be treated batchwise and also continuously by means of the inventive method. If a bulk material is treated continuously with the inventive method, it flows at one end into the plowshare mixer, which is provided for this purpose, and leaves the plowshare mixer at the other end. The bulk material, flowing continuously out of the plowshare mixer, has the desired product properties and is oxidized or depolymerized to the extent intended. The units for supplying product to and discharging product from the plowshare mixer are designed so that the bulk material, which is to be treated, can be supplied and discharged without escape of the mixture of oxygen and ozone gases from the plowshare mixer.

Bulk material is treated oxidatively in a container owing to the fact that the bulk material, which is to be treated, is transferred into the container and moistened there with water or an aqueous solution to such an extent, that it can be treated with a mixture of oxygen and ozone gases and that the end product aimed for has a particular pH or a particular solubility or a particular polarity or a particular solubility behavior and/or particle size distribution. Bulk materials can be oxidized very effectively with the inventive method with the least amounts of ozone in a mixture of oxygen and ozone gases, so that 70 to 100% of the available of ozone is reacted.

The invention claimed is:

1. Oxidative treatment of bulk materials in a container and a processing station, which is connected with the container and which processes oxygen into a mixture of oxygen and ozone, the gas mixture, flowing into the container, being mixed with the bulk material that is to be treated and the gas mixture flowing out of the container, provided that it still contains ozone, being purified to remove solids and reduced to oxygen in equipment downstream from the container, characterized in that the bulk material, which is to be treated in the container, is moistened before and/or during the treatment with the mixture of oxygen and ozone gases, so that the moisture content of the bulk material is not greater than 40%, based on the total weight of the bulk material, which is to be treated, and that the end product, present after the oxidation and/or depolymerization, is dried in the container to the desired, final moisture content.

2. The method of claim 1, characterized in that the bulk material, which is to be treated, is cooled or heated before and/or during the treatment with the mixture of oxygen and ozone gases.

3. The method of claim 1, characterized in that the bulk material, which is to be treated, is moistened with water or an aqueous solution of acetic acid or sodium hydroxide.

4. The method of claim 1, characterized in that portions of natural materials in the bulk material, which is to be treated, and the bulk material itself, which is to be treated, are oxidized and/or depolymerized.

5. The method of claim 1, characterized in that the bulk material, which is to be treated, is mixed in the container with the mixture of oxygen and ozone gases under a pressure of not less than 1 bar.

6. The method of claim 1, characterized in that the oxidation and/or the depolyinerization of the bulk material, which is to be treated, is controlled and/or regulated in that the proportion of ozone in the gas mixture, flowing into or out of the container, is determined continuously or at certain time intervals.

7. The method of claim 1, characterized in that the product properties, achieved in the bulk material by the treatment with the mixture of oxygen and ozone gases, are controlled and/or regulated by determining the moisture content of the bulk material.

8. The method of one of the claims claim 1, characterized in that the concentration of ozone in the mixture of oxygen and ozone gases, flowing into the container, and/or the residence time of the mixture of oxygen and ozone gases in the container are varied.

9. The method of claim 1, characterized in that the container is filled to the extent of 10 to 80% with product.

10. The method of claim 1, characterized in that the oxidation and/or the depolymerization of the bulk material, which is to be treated, is carried out in a plowshare mixer working batchwise or continuously.

11. The method of claim 1, characterized in that the mixture of oxygen and ozone gases and the liquid, consisting of water or an aqueous solution, are brought in the lower part of the container simultaneously or at different times into the bulk material, which is to be treated.

12. The method of claim 1, characterized in that the end product, present after the oxidation and/or depolymerization, is dried to the desired final moisture content in the container.

13. The method of claim 1, characterized in that the ultimate particle size distribution of the end product is achieved by varying the mixing elements, movably mounted in the container, and/or by mixing, cutting and/or agglomerating elements rotating at high speed in the container.

14. Device for the oxidative treatment of bulk materials
  with a container for the oxidative treatment of bulk materials and
  with a processing station, connected with the container for converting oxygen into a mixture of oxygen and ozone gases,
  the container is equipped as a mixer, in order to mix the gas mixture, flowing into the container, with the bulk material, which is to be treated,
  with a device, downstream from the container, for reducing any ozone, which may still be contained in the gas mixture flowing out of the container, into oxygen, after any solids in the gas mixture have been removed, characterized in that, the apparatus comprises means for moistening the bulk material, which is to be treated in the container, before and/or during the treatment with the mixture of oxygen and ozone gases, so that the moisture content of the bulk material can be adjusted to a value less than 40%, based on the total weight of the bulk material, which is to be treated.

15. The device of claim 14, characterized in that means are provided, with which the end product, present after the oxidation and/or the depolymerization, can be dried in the container to the desired final moisture content.

* * * * *